United States Patent
Jechoux et al.

(10) Patent No.: US 11,296,857 B2
(45) Date of Patent: Apr. 5, 2022

(54) CONFIGURATION OF TIME DOMAIN MULTIPLEXING

(71) Applicant: JRD COMMUNICATION (SHENZHEN) LTD, Guangdong (CN)

(72) Inventors: Bruno Jechoux, Guangdong (CN); Umer Salim, Guangdong (CN); Sebastian Wagner, Guangdong (CN)

(73) Assignee: JRD COMMUNICATION (SHENZHEN) LTD, Guangdong (CN)

( * ) Notice: Subject to any disclaimer, the term of this patent is extended or adjusted under 35 U.S.C. 154(b) by 0 days.

(21) Appl. No.: 16/607,080

(22) PCT Filed: Nov. 9, 2018

(86) PCT No.: PCT/CN2018/114893
§ 371 (c)(1),
(2) Date: Oct. 21, 2019

(87) PCT Pub. No.: WO2019/096072
PCT Pub. Date: May 23, 2019

(65) Prior Publication Data
US 2020/0382266 A1    Dec. 3, 2020

(30) Foreign Application Priority Data

Nov. 16, 2017  (GB) ..................................... 1718989

(51) Int. Cl.
*H04L 5/14* (2006.01)
*H04L 5/00* (2006.01)
*H04W 72/04* (2009.01)

(52) U.S. Cl.
CPC .......... *H04L 5/1469* (2013.01); *H04L 5/0007* (2013.01); *H04L 5/0073* (2013.01); *H04W 72/0446* (2013.01)

(58) Field of Classification Search
CPC ... H04L 5/0007; H04L 5/0042; H04L 5/0073; H04L 5/0094; H04L 5/1469; H04W 72/0446
See application file for complete search history.

(56) References Cited

U.S. PATENT DOCUMENTS 10,652,915 B1 *   5/2020  Mansour .................. H04L 5/14
2005/0232135 A1 * 10/2005  Mukai .................. H04L 5/0007
                                                           370/208

(Continued)

FOREIGN PATENT DOCUMENTS

WO    2014/116164 A1    7/2014
WO    2014/186993 A1    11/2014
WO    2017/183866 A1    10/2017

OTHER PUBLICATIONS

"Impact of UE-to-UE interference to DL Control Signalling", 3GPP TSG-RAN WG1 Meeting #90, R1-1714191, Aug. 20, 2017.
"On Group-Common PDC", Ericsson, 3GPP TSG-RAN WG1 Meeting#90bis, R1-1718629, Oct. 3, 2017.
Catania, et al., "The Potential of Flexible UL/DL Slot Assignment in 5G Systems", Vehicular Technology Conference (VTC Fall), 2014 IEEE 80th, Sep. 14, 2014.

(Continued)

*Primary Examiner* — Stephen J Clawson
(74) *Attorney, Agent, or Firm* — BakerHostetler (57) ABSTRACT

Methods and techniques for slot format configuration in a Time Domain Duplex system to allow flexible assignment of resources between uplink and downlink, while avoiding Cross Link Interference. As standard slot ordering is provided together with rules to limit modification of slot format between slots such than an estimate of safe regions can be made.

10 Claims, 5 Drawing Sheets

(56) References Cited

U.S. PATENT DOCUMENTS

| | | | |
|---|---|---|---|
| 2011/0267997 A1* | 11/2011 | Seo | H04W 4/06 370/280 |
| 2013/0336195 A1* | 12/2013 | Seo | H04L 5/0016 370/315 |
| 2014/0050125 A1* | 2/2014 | Zhang | H04J 3/1694 370/280 |
| 2014/0050183 A1* | 2/2014 | Mochizuki | H04L 5/0035 370/329 |
| 2014/0198773 A1* | 7/2014 | Yin | H04L 5/001 370/336 |
| 2017/0303144 A1 | 10/2017 | Guo et al. | |
| 2019/0306855 A1* | 10/2019 | Tiirola | H04W 72/0446 |
| 2020/0245255 A1* | 7/2020 | Baldemair | H04W 52/146 |

OTHER PUBLICATIONS

"Dynamic TDD—SFI Handling and Interference Management", TCL Communication, 3GPP TSG RAN WG1 #91, R1-1719706, Nov. 17, 2017.

TCL Communication, "Dynamic TDD—SFI Handling and Interference Management", 3GPP TSG RAN WG1 #91, R1-1719706, Dec. 1, 2017.

CMCC, "Considerations on DL-UL interference coordination", 3GPP TSG RAN WG1 #89, R1-1708402, May 19, 2017.

MediaTek Inc., "Evaluation on interference management techniques", 3GPP TSG RAN WG1 Meeting #88bis, R1-1704451, Apr. 7, 2017.

\* cited by examiner

CONFIGURATION OF TIME DOMAIN MULTIPLEXING

CROSS-REFERENCE TO RELATED APPLICATIONS

This application is a National Stage of International patent application PCT/CN2018/114893, filed on Nov. 9, 2018, which claims priority to foreign Great Britain patent application No. GB 1718989.5, filed on Nov. 16, 2017, the disclosures of which are incorporated by reference in their entirety.

TECHNICAL FIELD

The current disclosure relates to configuration of time domain multiplexing, and in particular to the configuration and signalling of uplink and downlink periods in a time domain duplex system.

BACKGROUND

Wireless communication systems, such as the third-generation (3G) of mobile telephone standards and technology are well known. Such 3G standards and technology have been developed by the Third Generation Partnership Project (3GPP). The $3^{rd}$ generation of wireless communications has generally been developed to support macro-cell mobile phone communications. Communication systems and networks have developed towards a broadband and mobile system.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB.

NR is currently intended to utilise a Time-Domain Duplex (TDD) system to share spectrum resources between uplink and downlink transmissions. In a particular TDD system communication signals are aligned in slots, each slot comprising a defined number of OFDM symbols. Each OFDM symbol may be an uplink symbol, a downlink symbol, or a guard symbol.

In TDD systems it is desirable to provide flexible configuration of the uplink and downlink resources on a per-Transmit/Receive Point (TRP) basis to adapt to changing network demands. However, inconsistent definition of uplink and downlink periods between overlapping radio resources can lead to Cross Link Interference (CLI) between resources.

Figure 1:
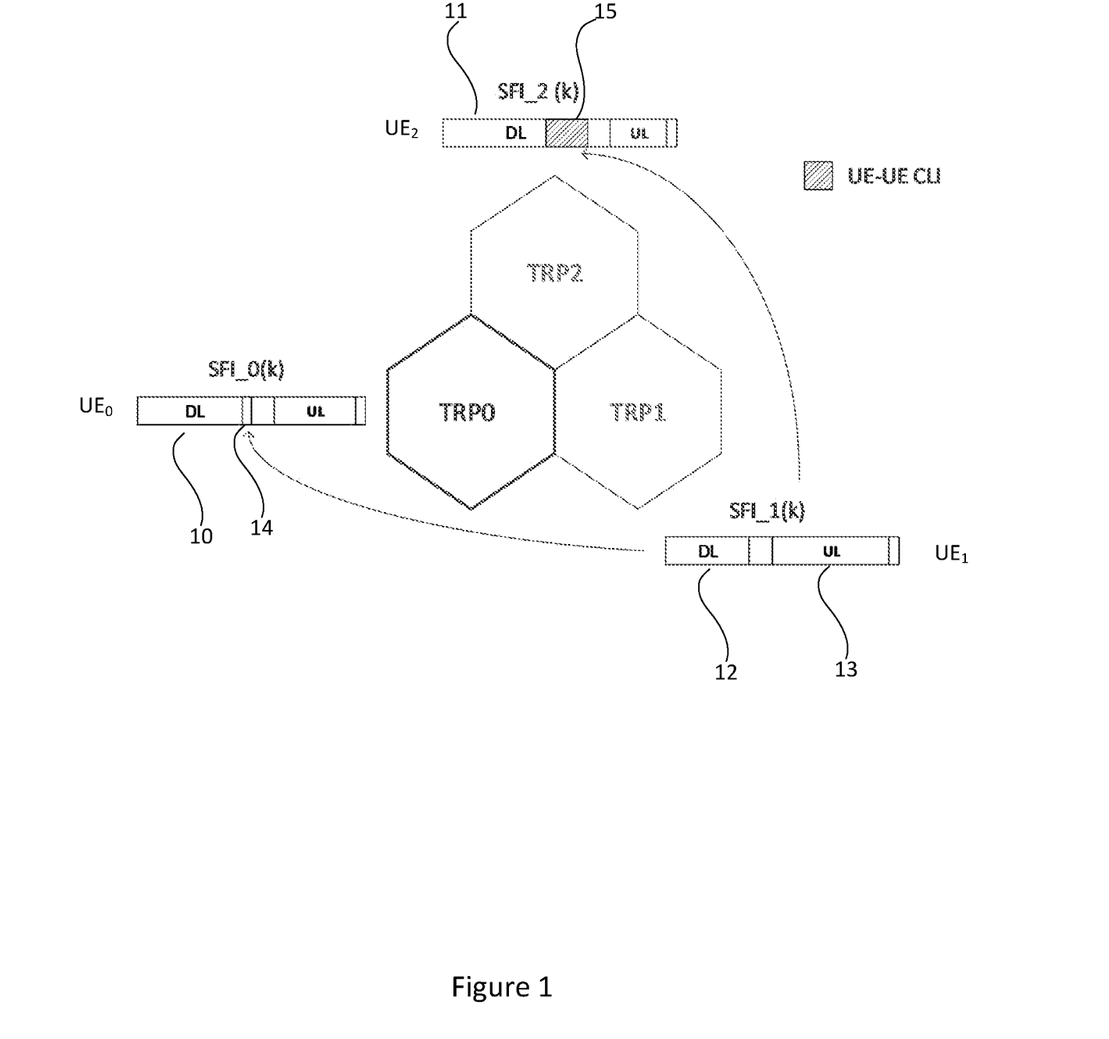
FIG. 1 shows an example of UE CLI interference.

FIG. 1 shows an example of UE-UE CLI for three UEs—$UE_0$, $UE_1$, $UE_2$—connected to three nearby, but separate TRPs—$TRP_0$, $TRP_1$, $TRP_2$. $UE_0$ and $UE_2$ are configured with longer downlink periods 10, 11 than the downlink period 12 of $UE_1$. The uplink period 13 of $UE_1$ therefore overlaps with the end of the downlink periods 10, 11 of $UE_0$ and $UE_2$ at regions 14, 15. $UE_1$'s reception is thus likely to suffer high levels of interference.

Figure 2:
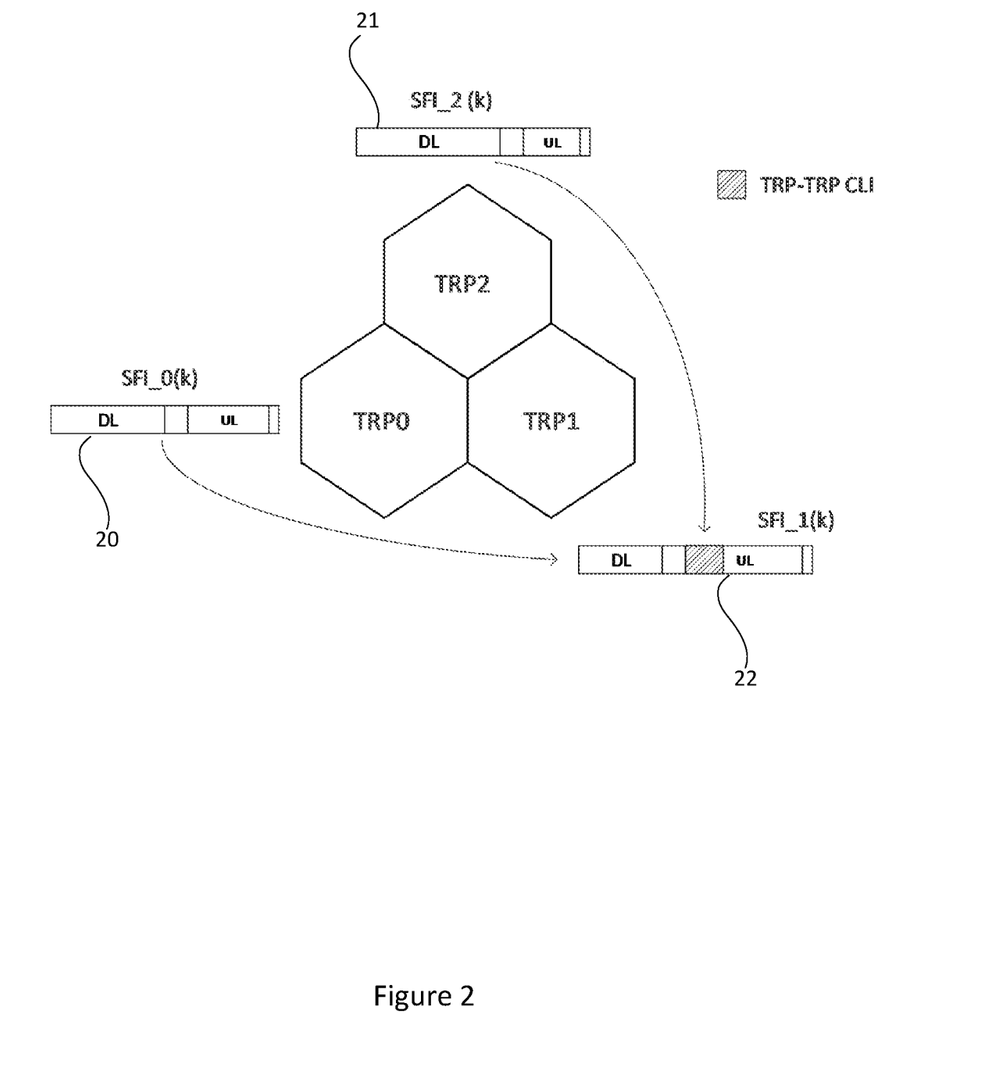
FIG. 2 shows an example of TRP CLI interference.

FIG. 2 shows a further example of CLI, between proximal TRPs. Here $TRP_0$ and $TRP_2$ are configured with longer downlink periods 20, 21 than TRP1. The end of the periods 20, 21 overlap the start of $TRP_1$'s uplink period 22 leading to significant interference. Unlike UE-UE interference, TRP-TRP interference as shown in FIG. 2 may occur between TRPs operating in different, but close, frequency bands (for example with co-located antennas) due to high transmission powers and imperfect RF isolation. TRP-TRP CLI interference can be sufficiently strong to act as a complete block for the victim TRP. Such interference can be particularly difficult to resolve as co-located TRPs are often operated by different operating companies with no communications between the systems.

Comparable to the LTE system, in 5G/NR, it is proposed that gNBs will be connected by an Xn interface. Such interfaces may be utilised to share details of slot configurations, and UL/DL safe regions in which traffic can be scheduled to avoid CLI. gNBs could also gather such "safe region" information from measurements or status reports at UE and gNB level. However, all such techniques rely on backwards-looking data, and hence suffer from data aging. Measurements (BLER, buffer status) may have poor accuracy, and communications incur overheads. They are not therefore reliable, flexible, mechanisms for avoiding CLI while allowing flexible configuration of TDD periods.

There is therefore a requirement for a configurable TDD system which mitigates CLI effects.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a method of allocating resources in a slot-based time domain duplex system, wherein each slot comprises a plurality of OFDM symbols, the method comprising the steps of at a base station defining, for a slot k, an uplink region of $u_k$ OFDM symbols, and a downlink region of $d_k$ OFDM symbols, and at the base station defining, for a slot k+1, an uplink region $u_{k+1}$ of $u_k$+/−n OFDM symbols, and a downlink region $d_{k+1}$ of $d_k$+/−n OFDM symbols, where k and n are positive integers and $u_k+d_k=u_{k+1}+d_{k+1}$.

n may be 1.

The method may further comprise the step of the base station communicating, during or before slot k, the configuration of slot k to at least one other base station.

The communication may include an indication of $u_k$ and $d_k$.

The method may further comprise the step of at the base station defining, for a slot k+m, an uplink region of $u_{k+m}$ OFDM symbols and a downlink region of $d_k$, OFDM symbols, where k and m are positive integers and communicating, during slot k, $u_{k+m}$ and $d_{k+m}$ to at least one other base station.

M may be 2.

The downlink region may precede the uplink region within the slot.

Each slot may comprise one downlink region and one uplink region.

The uplink and downlink regions within a slot may be separated by a guard period of at least one OFDM symbol.

There is also provided a method of determining a safe region within a slot-based time domain duplex system, wherein each slot comprises a plurality of OFDM symbols, the method being performed at a first base station and comprising the steps of identifying an overlap of a first region of a second base station and a second region of the first base station within a slot k; and determining a possible overlap of the first region of the second base station and the second region of the first base station for a slot k+1 based on the identified overlap and a rule that the length of the first region of the second base station may not change by more than n OFDM symbols between slot k and slot k+1, wherein a safe region is identified as a region without an overlap.

The first region may be a downlink region and the second region may be an uplink region.

The first region may be an uplink region, and the second region may be a downlink region.

n may be 1.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

In order to provide a configurable TDD system, which also mitigates CLI, the following disclosure sets out methods of allocating uplink and downlink resources. The methods disclosed provide defined rules for allocating uplink and downlink resources which enable flexible configuration, while also limiting CLI. As described below a set of rules are provided which may be applied singly, or in combination, as may be appropriate. The disclosure assumes that slots are aligned between all relevant TRPs.

Figure 3:
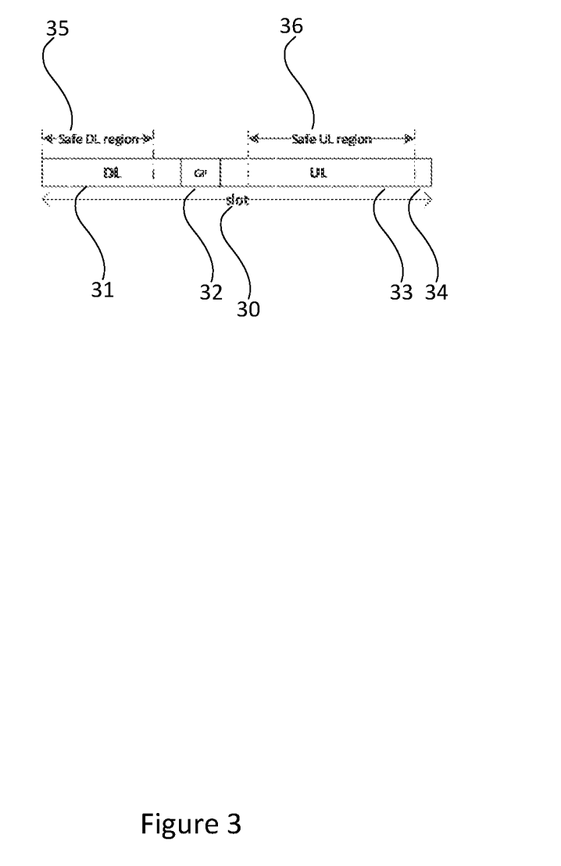
FIG. 3 shows an example slot format.

Previously completely flexible use of slots has been possible. That is UL, DL, and guard periods can be freely defined in length and order. FIG. 3 shows a slot format to be utilised by each TRP to enable co-operation and flexible configuration. Each OFDM symbol may be a DL, UL, or guard symbol. The slot 30 comprises a downlink region 31, a first guard period 32, an uplink region 33, and a second guard period 34 (which may be of zero length). Specifying the order of DL, guard, UL, guard (optional) allows flexible allocation of period lengths, while also enabling mechanisms to avoid CLI.

Neighbouring gNBs implement a semi-static agreement for safe regions 35, 36 in DL and UL regions 31, 33. A Slot Format Indication (SFI) may be transmitted between gNBs indicating an agreed format (for example, region lengths and/or start positions). For example, the first N1 symbols may be the safe DL region 35, and the last N2 symbols may be the safe UL region 36. Each gNB then knows, without measurement or transfer of information, that these regions will be CLI free and should be a reliable window. The safe regions 35, 36 may occupy the whole of the currently-agreed DL and UL regions 31, 33, thus maximising safe capacity, but only permitting reconfiguration by agreement between all gNBs. Alternatively the agreed safe regions 35, 36 may occupy only part of the DL and UL regions 31, 33, thus allowing reconfiguration provided the safe regions are not infringed.

The known safe regions may be particularly beneficial for URLLC traffic as they provide a reliable transmission period within a slot without the latency of waiting for the subsequent slot.

Figure 4:
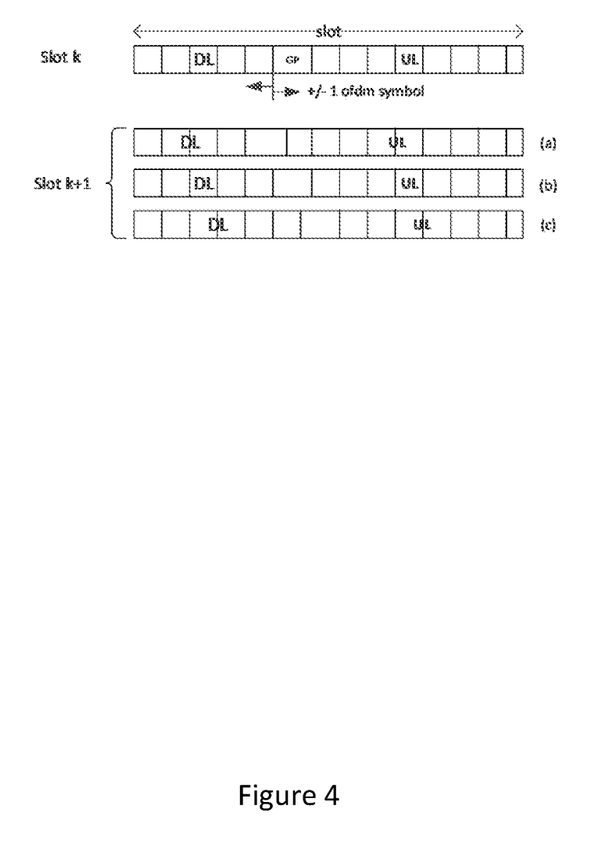
FIG. 4 shows adjustment of region lengths.

FIG. 4 shows a mechanism for adjusting DL/UL configuration while limiting the CLI impact. In slot k, the DL region occupies 5 OFDM symbols, while the UL region occupies 7 OFDM symbols. Each gNB is permitted to adjust the UL/DL regions in every slot, but only by +/−1 OFDM between slots. Thus, in slot k+1 the DL region may occupy (a) 4, (b) 5, or (c) 6 OFDM symbols, and the UL region may occupy (a) 8, (b) 7, or (c) 6 OFDM symbols. Since relevant gNBs are aware of the current configuration (slot k), and are aware of this mechanism, they can calculate the maximum extent of any CLI in slot k+1 and thus appropriately schedule traffic. That is, a safe region in slot k+1 can be identified from knowledge of slot k.

Configuration changes are performed at slot boundaries, and may be performed at every slot, or less regularly as required by traffic demands.

gNBs may communicate their current SFI via the Xn interface after each update, or at intervals, ensuring that awareness is kept relatively current. However, the application of this rule ensures that even past data can be used to give a reliable indication of current safe regions.

The above rule may be generalised such that the DL and UL region length may be changed by up to n OFDM symbols between slots, where n is an integer (1 in the above example). That is, the DL region length in slot k is d, and the UL region length in slot k is u, then $d_{k+1}=d_k+/-n$ and $u_{k+1}=u_k+/-n$ (provided $d_{k+1}+u_{k+1}=d_k+u_k$). As n increases the flexibility increases, but the available safe regions for slot k+1 decrease.

Since the slot-length and guard symbols are fixed, for the slot format shown in FIG. 3, a change in region length of n is a movement of the transition from downlink to uplink symbols.

This rule may also allow the effect of inter-operator CLI to be mitigated. TRP-TRP CLI occurs at a gNB receiver which can reliably gather BER/BLER at a per-symbol granularity, and detection is assisted by the high interference power. Once CLI-affected slots are identified for slot k, safe regions can be identified in slot k+1 as all regions more than n symbols away from the edge of the UL/DL regions in slot k are safe. The affected gNB, even if it cannot receive information on the configuration from the interfering gNB directly, can still reliably identify safe regions.

The limited rate of change of region length limits the speed at which capacity can be reconfigured, but it is anticipated that a change of 1 OFDM symbol per slot (about 7.1%) will be sufficient in NR since each slot is expected to have a slot length of 250 μs or less.

Figure 5:
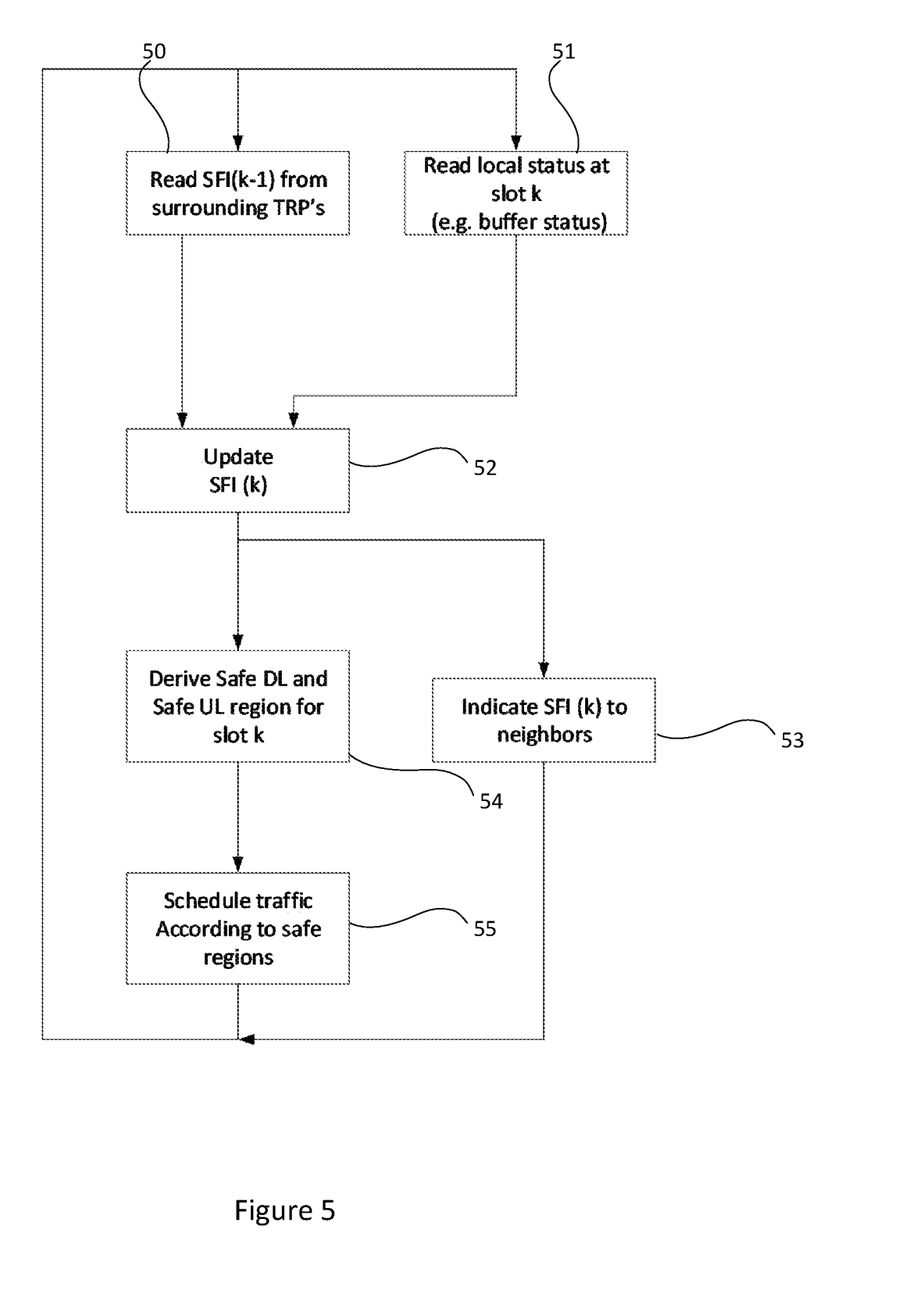
FIG. 5 shows a system of slot configuration.

FIG. 5 shows a graphical representation of the methods described above. At step 50 a TRP receives (or determines) the SFI for slot k−1 from surrounding TRPs. At step 51 the TRP determines the status for slot k (e.g. buffer status). At step 52 the TRP uses the information gathered at steps 50 and 51 to define its SFI for slot k, and at step 53 transmits its SFI to relevant TRPs. The SFI is updated according to the rules defined herein.

At steps 54 and 55 the TRP derives safe DL and UL regions, and schedules traffic accordingly.

In all of the foregoing description the SFI for a given slot may be defined in advance of that slot. The SFI information can therefore be transmitted in advance, or within, the particular slot.

Should a gNB require a faster change in region length than is possible with the above rule, a larger change may be allowed provided the intended SFI is communicated to relevant gNBs with m slots notice. For example, m may be 2. Typically a gNB will be aware of a forthcoming need to alter region allocation and thus a 2 slot delay should not create problems. Equally a 2 slot delay gives affected gNBs sufficient opportunity to schedule sensitive traffic appropriately within safe regions. gNBs which do not receive the indication of the change (for example a gNB of a different operator) may be surprised by this change and there may be one slot in which CLI is suffered. However the interfering gNB then returns to the +/−1 slot limit and so the victim gNB can adapt and the effect is limited to one slot.

gNBs will typically perform slot allocations and coordinate required communications between entities. The format for each slot is indicated by the gNBs to relevant UEs using an SFI within each slot.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method of allocating resources in a slot-based time domain duplex system, wherein each slot comprises a plurality of OFDM symbols, the method being performed by a plurality of proximal base stations in a cellular communication system and comprising the steps of:
    at a first proximal base station defining, for a slot k, an uplink region of $u_k$ OFDM symbols, and a downlink region of $d_k$ OFDM symbols, and
    at the first proximal base station defining, for a slot k+1, an uplink region of $u_{k+1}=u_k+/-n$ OFDM symbols, and a downlink region of $d_{k+1}=d_k+/-n$ OFDM symbols, where k and n are positive integers and $u_k+d_k=u_{k+1}+d_{k+1}$,
    wherein n=1, and
    wherein at a second proximal base station scheduling, n slot k+1, traffic based on the regions defined for slot k by the first proximal base station and n.

2. The method according to claim 1, further comprising the step of the base station communicating, during or before slot k, a configuration of slot k to at least one other base station.

3. The method according to claim 2, wherein the communication includes an indication of $u_k$ and $d_k$.

4. The method according to claim 1, wherein the downlink region precedes the uplink region within the slot.

5. The method according to claim 1, wherein each slot comprises one downlink region and one uplink region.

6. The method according to claim 1, wherein the uplink and downlink regions within a slot a separated by a guard period of at least one OFDM symbol.

7. A method of determining a safe region within a slot-based time domain duplex system, wherein each slot comprises a plurality of OFDM symbols, the method being performed at a first base station and comprising the steps of
    identifying an overlap of a first region of a second base station and a second region of the first base station within a slot k; and
    determining a possible overlap of the first region of the second base station and the second region of the first base station for a slot k+1 based on the identified overlap and a rule that the length of the first region of the second base station may not change by more than n OFDM symbols between slot k and slot k+1, wherein a safe region is identified as a region without an overlap.

8. The method according to claim 7, wherein the first region is a downlink region and the second region is an uplink region.

9. The method according to claim 7, wherein the first region is an uplink region, and the second region is a downlink region.

10. The method according to claim 7, wherein n=1.

* * * * *